(12) United States Patent
Blundo

(10) Patent No.: US 6,930,246 B1
(45) Date of Patent: Aug. 16, 2005

(54) SPLIT JUNCTION BOX

(76) Inventor: Benjamin M. Blundo, 2716 Graceland Rd., New Castle, PA (US) 16105

(*) Notice: Subject to any disclaimer, the term of this patent is extended or adjusted under 35 U.S.C. 154(b) by 0 days.

(21) Appl. No.: 10/853,649

(22) Filed: May 26, 2004

(51) Int. Cl.$^7$ .............................................. H02G 3/08
(52) U.S. Cl. .......................... 174/50; 174/64; 174/135; 248/906
(58) Field of Search ................. 174/50, 64, 65 R, 174/60, 17 CT, 135; 220/3.2, 4.02, 3.8; 439/535; 248/906

(56) References Cited

U.S. PATENT DOCUMENTS

| | | | |
|---|---|---|---|
| 3,620,404 A | * 11/1971 | Grasso | ........................ 220/477 |
| 3,858,161 A | 12/1974 | Champion et al. | |
| 4,724,281 A | 2/1988 | Nix et al. | |
| 4,854,461 A | * 8/1989 | Daniel et al. | ............... 220/4.01 |
| 5,272,279 A | 12/1993 | Filshie | |
| 5,347,088 A | 9/1994 | Marsh et al. | |
| 5,525,754 A | 6/1996 | Akins | |
| 5,965,845 A | 10/1999 | Reiker | |
| 6,159,033 A | 12/2000 | Oka | |
| 6,265,657 B1 | * 7/2001 | Layne | .......................... 174/50 |
| 6,376,770 B1 | * 4/2002 | Hyde | ............................ 174/58 |
| 6,852,924 B2 | * 2/2005 | Lessard | ........................ 174/50 |

* cited by examiner

Primary Examiner—Dhiru R. Patel
(74) Attorney, Agent, or Firm—Donald R. Schoonover

(57) ABSTRACT

A junction box used to contain wiring associated with a static structure, such as a building, includes two parts that are releasably held together. Each part has at least one arcuate notch defined in an edge, with the notches being aligned with each other in the assembled junction box to define outlet holes through which wires extend into and out of the assembled junction box.

2 Claims, 1 Drawing Sheet

SPLIT JUNCTION BOX

BACKGROUND OF THE INVENTION

1. Field of the Invention

The present invention relates to the general art of electrical wiring accessories for static structures, and to the particular field of wiring junction boxes.

2. Discussion of the Related Art

Contractors are constantly looking for more efficient ways of performing certain tasks to reduce time spent and to thereby reduce labor costs. One particular construction trade wherein many of the tasks are repetitive and could benefit from more efficient methods of practice is electrical construction. In particular, many connections must be fabricated where electrical wires are spiced into other electrical wires. As generally required by Building Codes, these spices must be contained within an enclosure, sometimes referred to as a junction box.

Many times, junction boxes are simply square or rectangularly shaped enclosures with "knock-outs" on the sides of the box and a removable, screw-on lid. The ends of wires to be spliced are manually poked through holes vacated by knock-outs in the sides of the box. Then, the electrician must use his hands within the crowded confines of the box to make the desired splices, which can be time-consuming and frustrating. After completing the splices, the lid is attached and the electrician moves on to the next task, perhaps more splices in another junction box.

Therefore, there is a need for a junction box that may be installed after making wiring splices intended to be protected by the junction box.

In many presently-existing junction boxes, the electrician must use wire securing clamps to attach the wires to the junction box. This is time consuming and may require the electrician to carry extra equipment and tools.

Therefore, there is a need for a junction box that eliminates the need for making wire-securing clamps.

Electricians presently use between six inches and a foot of wire per connection. This requirement is per wire entering the junction box, so connection of two wires uses between one to two feet of wire. With the present invention, the quantity of wire needed to make a connection is approximately one-half of that which is presently used because the entire junction box of the present invention can be removed without the connection being taken apart in the event of a later repair. After the repair is completed, the junction box of the present invention can be reinstalled.

Still further, there is a need for a junction box that is reliable and long lasting whereby an already installed junction box need not be replaced soon after it has been installed.

PRINCIPAL OBJECTS OF THE INVENTION

It is a main object of the present invention to provide a junction box that may be installed after making wiring splices intended to be protected by the junction box.

It is another object of the present invention to provide a junction box that eliminates the need for making wire-securing clamps.

It is another object of the present invention to provide a junction box that saves material by using less wire per connection.

It is another object of the present invention to provide a junction box that is reliable and long lasting.

SUMMARY OF THE INVENTION

These, and other, objects are achieved by a two-part junction box that has curved cutout notches on the edges of each part of the box. The notches are located to define curved outlet holes when the two parts of the box are joined together. Wires contained in the box can be located in the outlet holes. One part of the junction box is mounted on a support, wires are located and spliced and then placed inside the mounted part of the junction box. The second part of the junction box is then attached to the mounted part and the box is closed with the wires extending through the outlet holes.

Using the junction box embodying the present invention will permit an electrician to install the junction box after making wiring splices which are intended to be protected by the junction box. No wire-securing clamps are required because the wires are located inside the junction box and the junction box embodying the present invention is made of long-lasting durable materials.

Connections can be made using less wire than is presently being used. Less wire is required per connection because the connections and repairs can be made without the presence of the junction box, which can be removed and then installed later.

BRIEF DESCRIPTION OF THE DRAWING FIGURES

DETAILED DESCRIPTION OF THE PREFERRED EMBODIMENT

Other objects, features and advantages of the invention will become apparent from a consideration of the following detailed description and the accompanying drawings.

Figure 1:
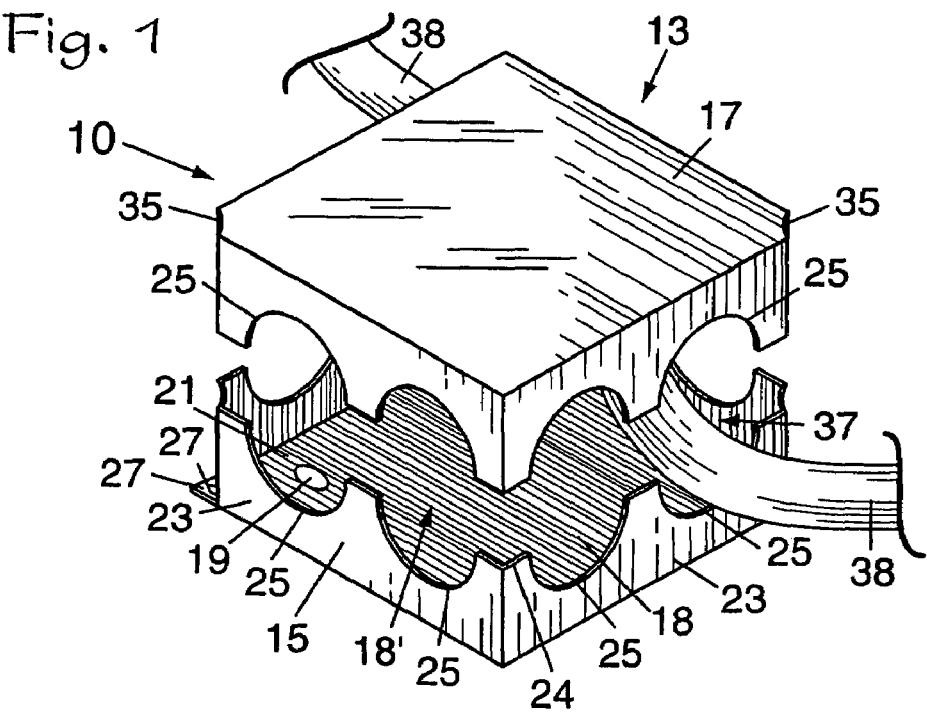
FIG. 1 is a perspective view of a split junction box embodying the present invention.
Figure 2:
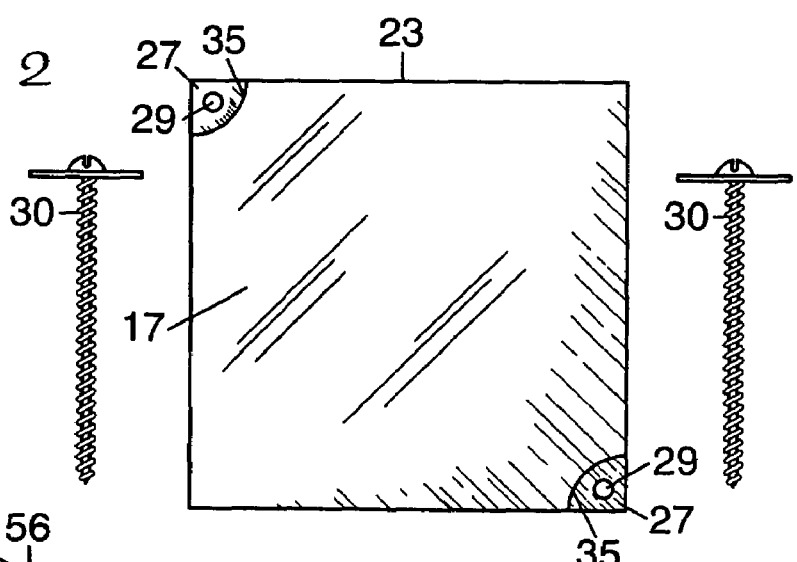
FIG. 2 is a top plan view of the split junction box shown in FIG. 1.

Referring to the Figures, it can be understood that the present invention is embodied in a hollow split junction box 10. Junction box 10 includes a body 13 having a first or base portion 15 and a second or top portion 17. When the top portion 17 and base portion 15 are secured together as indicated in FIG. 1, the interior 18 of the junction box 10 is hollow and defines an interior volume 18' which will contain spliced wires as will be understood from the teaching of this disclosure.

Base portion 15 is generally square in shape with dimensions similar to those of other commonly used square junction boxes. It is understood, however, that split junction box 10 may have other suitable dimensions and shapes without departing from the scope of the present disclosure. Base portion 15 includes at least two orifices, such as orifice 19, defined through a back plate 21 for securing the base portion 15 to an adjacent support structure. Base portion 15 also includes four sides, such as side 23, each of which contains two arcuate notches 25 defined therein on an edge 24 thereof.

Top portion 17 is substantially similar to base portion 15 with an exception wherein the base portion includes two tabs 27, each of which includes a tapped orifice 29 therethrough for securing the top portion 17 to the base portion 15.

In an application of the split junction box 10 embodying the present invention, various wring splices are made in close proximity to each other, wherein those wiring splices are to subsequently be enclosed inside the junction box 10. After all of the splices have been completed, the base portion 15 is maneuvered between the splices and the supporting surface. The base portion 15 is then secured to the supporting surface and the wires comprising the splices are manipulated so they are aligned with various notches 25 as convenient. Top portion 17 is then placed over and aligned with base portion 15 whereby notches 25 of top portion 17 are aligned with notches 25 of base portion 15. Top portion 17 is then secured to base portion 15 with long screws 30, each having an enlarged portion 32 for operatively abutting the second portion 17 when the screws 30 are mounted in mounting slots 35 in opposing corners of top portion 17 and base portion 15 thereby encasing and protecting the splices.

Spliced wires 37 are located inside the interior volume and extend out of the interior volume through the notches 25 as indicated by spliced wire 38.

Figure 3:
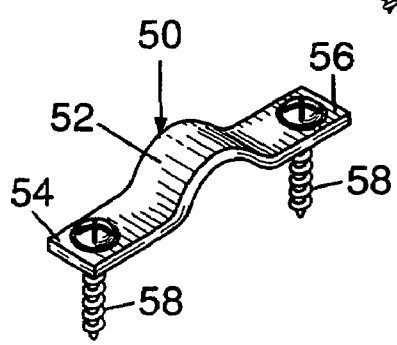
FIG. 3 is a perspective view of an optional wire-securing clamp which can be used in connection with the split junction box embodying the present invention.

Wire-securing clamps 50, such as shown in FIG. 3, may also be used if desired. Clamp 50 includes a U-shaped body 52 having ends 54 and 56 through which self-taping screws 58 are received. The screws 58 will engage the junction box 10 to mount the spliced wires to the junction box 10 as desired and preferably to planar portion back plate 21 of base portion 15.

It is understood that while certain forms of the present invention have been illustrated and described herein, it is not to be limited to the specific forms or arrangements of parts described and shown.

What is needed and desired to be covered by Letters Patent is as follows:

1. A split junction box comprising:
   a) a first portion which is adapted to be mounted on a support in a use condition and which includes
      (1) a planar portion having at least one mounting fastener-accommodating orifice defined therethrough,
      (2) a plurality of sides, each side having an edge, each edge being spaced apart from the planar portion,
      (3) at least one arcuate notch defined in each of the sides, each notch being defined in a plane that is perpendicular to a plane containing the planar portion, and
      (4) at least two tabs with tapped orifices and screw-accommodating slots defined in opposing corners of said first portion;
   b) a second portion which includes
      (1) a planar portion,
      (2) a plurality of sides, each side having an edge, each edge being spaced apart from the planar portion of said second portion,
      (3) at least one arcuate notch defined in each of the sides of said second portion, each notch of said second portion being defined in a plane that is perpendicular to a plane containing the planar portion of said second portion,
      (4) the arcuate notches of said second portion being mirror images of the arcuate notches of said first portion and being located to be aligned with the arcuate notches of said first portion to define circular openings through the sides of said second portion and said first portion when the edges of the sides of said second portion are in contact with the edges of the sides of said first portion, and
      (5) at least two screw-accommodating slots defined in opposing corners of said second portion, the screw-accommodating slots of said second portion being located to be aligned with the screw-accommodating slots of said first portion;
   c) an interior volume defined when the edges of said second portion are in contact with the edges of said first portion;
   d) screws extending through the screw-accommodating slots of said first portion and said second portion, said screws having enlarged portions that operatively abut said second portion thereby securing said second portion to said first portion when said second portion and said first portion are in use; and
   e) spliced wires being located inside said interior volume.

2. The split junction box as described in claim 1 further including a wire-securing clamp having a U-shaped body and self-taping screws which are sized and adapted to secure said wire-securing clamp to the planar portion of said first portion with a spliced wire located between the body of said wire-securing clamp and the planar portion of said first portion.

* * * * *